(No Model.)
J. VELIE.
COOKING UTENSIL.
No. 535,473. Patented Mar. 12, 1895.
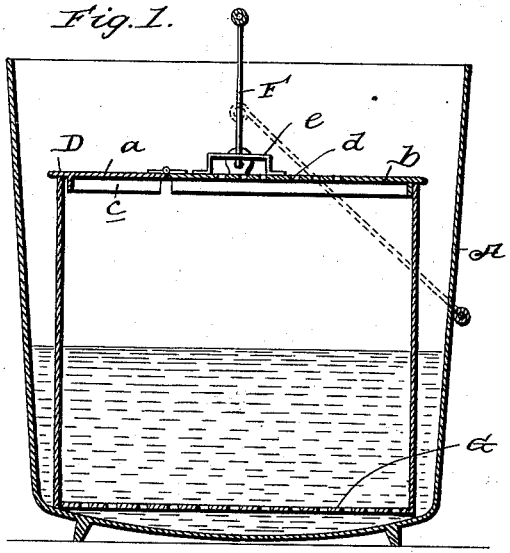
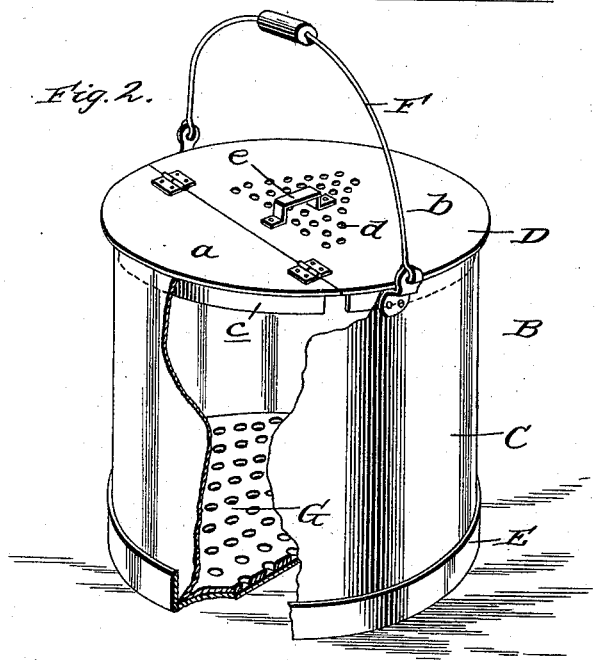
Witnesses:
C. H. Raeder
K. T. Matthews
Inventor
John Velie
By James J. Shuhy
Attorney

UNITED STATES PATENT OFFICE.

JOHN VELIE, OF WINNIPEG, CANADA.

COOKING UTENSIL.

SPECIFICATION forming part of Letters Patent No. 535,473, dated March 12, 1895.

Application filed November 13, 1894. Serial No. 528,657. (No model.)

*To all whom it may concern:*

Be it known that I, JOHN VELIE, a citizen of Canada, residing at Winnipeg, in the county of Selkirk and Province of Manitoba, Canada, have invented certain new and useful Improvements in Cooking Utensils; and I do declare the following to be a full, clear, and exact description of the invention, such as will enable others skilled in the art to which it appertains to make and use the same.

My invention relates to improvements in cooking utensils; and it has for its general object to provide a very cheap and simple utensil designed to hold potatoes or the like in a pot containing water in such a manner as to enable the water to gain access to the potatoes, and also adapted to drain the water from the potatoes when it is lifted from the pot, and a flanged bottom adapted to receive the utensil when it is removed from the pot so as to close the apertures in the bottom of the utensil and prevent loss of potatoes when the same are mashed.

To the attainment of the foregoing the invention consists in the peculiar construction, novel combination and adaptation of parts hereinafter described and particularly pointed out in the claim appended.

In the drawings, Figure 1, is a vertical, sectional view illustrating my improved utensil in a pot; and Fig. 2, is a perspective view, partly broken away, illustrating the utensil removed from the pot and provided with its removable bottom.

Referring by letter to said drawings, A, indicates a pot, or the like, which may be of the ordinary construction, and B, indicates my improved utensil which may be made of any material suitable to the purpose. This utensil B, is preferably of a circular form in cross-section as shown, and it comprises the body C, the cover D, and the removable flanged bottom E.

The body C, of the utensil has a suitable bail as F, whereby it may be conveniently handled, and it is provided as shown at the lower end of its imperforate side walls with a bottom G, which is perforated to enable the water in the pot to enter the utensil.

The cover D, of the utensil comprises two sections $a$, $b$, which are connected in a hinged manner, as shown, so that the smaller section $a$, may be readily raised to inspect the contents of the utensil, and are provided with flanges $c$, designed and adapted to prevent the cover from being casually displaced. The larger cover section $b$, is provided with a series of apertures $d$, to permit the escape of steam and is also provided with a handle as $e$, whereby it may be readily placed in and removed from the pot.

In using my improved utensil, the vegetable, meat or other substance to be cooked is placed in the utensil which is then lowered into the pot containing water, as shown in Fig. 1, and allowed to remain until the cooking is completed. The utensil is then lifted out of the pot, when, by reason of the bottom G, being perforated, the water will drain from the utensil back into the pot. After being removed from the pot, the utensil is placed in the flanged bottom E, which will close the apertures in the bottom G, and permit of potatoes and the like being mashed in the vessel without loss.

My improved utensil is also advantageous for making soup and the like, as all the meats, vegetables, &c., may be placed within it, and when the soup is done may be removed by simply lifting the utensil out of the pot, thus leaving the soup clear, which is a desideratum.

In addition to the foregoing, my improved utensil is advantageous for cooking potatoes and other vegetables which are mashed before being served, inasmuch as the imperforate sides of the utensil body and the bottom E, admit of mashing the vegetables without loss as the bottom E, will close the apertures in the bottom G, and prevent the potatoes from passing through the same. The said removable bottom E, is also designed and adapted to be placed on the body when the utensil is employed to cook substance from which it is desirable to exclude water.

It will be seen from the foregoing description taken in conjunction with the accompanying drawings that I have provided a cooking utensil adapted to contain vegetables and be placed in a pot containing water, and one in which the vegetables or meat may be cooked with or without excluding the water, which is an important advantage. It will also be seen that my utensil is very simple and that consequently it may be manufactured almost as cheaply as the ordinary utensil, and that by reason of its employment, time and labor may be saved which is a desideratum.

Having described my invention, what I claim is—

The herein described cooking utensil adapted to be placed in a pot and consisting essentially of the body C, having the imperforate side walls and the perforated bottom G, arranged at the lower ends of the side walls, and the removable flanged bottom E, adapted to receive the body and close the perforations in the bottom thereof, as and for the purpose set forth.

In testimony whereof I affix my signature in presence of two witnesses.

JOHN VELIE.

Witnesses:
    WALTER CHESTERTON,
    HEUBERT DELFORD.